US006324565B1

United States Patent
Holt, III

(10) Patent No.: US 6,324,565 B1
(45) Date of Patent: Nov. 27, 2001

(54) DYNAMICALLY GENERATED DOCUMENT CACHE SYSTEM

(75) Inventor: George Alexander Holt, III, Hartsdale, NY (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 08/905,794

(22) Filed: Jul. 28, 1997

(51) Int. Cl.[7] .................................................. G06F 17/30
(52) U.S. Cl. ............................................. 709/203; 707/10
(58) Field of Search ........................ 375/200.47, 200.48, 375/200.49, 200.32; 707/10, 200, 104, 7; 709/203, 219, 231, 229, 213, 234, 217, 224

(56) References Cited

U.S. PATENT DOCUMENTS

| | | | |
|---|---|---|---|
| 5,699,526 | * 12/1997 | Siefert | 395/227 |
| 5,745,754 | * 4/1998 | Lagarde et al. | 395/615 |
| 5,754,774 | * 5/1998 | Bittinger et al. | 709/203 |
| 5,758,078 | * 5/1998 | Kurita et al. | 395/200.33 |
| 5,761,673 | * 6/1998 | Bookman et al. | 707/104 |
| 5,781,909 | * 7/1998 | Logan et al. | 707/200 |
| 5,790,790 | * 8/1998 | Smith et al. | 395/200.36 |
| 5,806,065 | * 9/1998 | Lomet | 707/8 |
| 5,857,191 | * 1/1999 | Blackwell, Jr. et al. | 707/10 |
| 5,918,013 | * 6/1999 | Mighdoll et al. | 709/203 |
| 6,003,087 | * 12/1999 | Housel, III et al. | 709/229 |
| 6,012,083 | * 1/2000 | Savitzky et al. | 709/202 |

FOREIGN PATENT DOCUMENTS

WO 97/17662   5/1997  (WO).
WO 97/19415   5/1997  (WO).

OTHER PUBLICATIONS

Brooks et al., "Application–Specific Proxy Servers as HTTP Stream Transducers," Website, www.w3.org/Conferences/WWW4/Papers/56, 9 pages.

Douglis et al., "Tracking and Viewing Changes on the Web," 1996 USENIX Technical Conference, Jan. 22–26, 1996, San Diego, California, pp. 165–176.

International Search Report, International Application No. PCT/US98/14678, International Filing Date Jul. 15, 1998.

* cited by examiner

Primary Examiner—Jack Choules
Assistant Examiner—Mohammad Ali
(74) Attorney, Agent, or Firm—Townsend and Townsend and Crew LLP

(57) ABSTRACT

A system for dynamically generating documents utilizes document programs and data at a content providing server to generate those documents. When an intermediate server requests a dynamically generated document from a content providing server, the content providing server transmits the instructions or programs to create the document along with data utilized by the program or instructions in creating the document. The intermediate server then retains or caches the document programs as well as the data. When the intermediate server next requires the document, that document is generated at the intermediate server rather than requiring that it be obtained from the content providing server. The content providing server retains a register of the intermediate servers which have received document programs or data. If there are changes to the document programs or data, such changes are broadcast to the intermediate servers which had cached that information.

22 Claims, 3 Drawing Sheets

DYNAMICALLY GENERATED DOCUMENT CACHE SYSTEM

FIELD OF THE INVENTION

The present invention relates generally to the transmission and storing of documents in a computer network and more particularly to the transmission and storing of information used to dynamically generate documents.

BACKGROUND OF THE INVENTION

The increase in the volume of blocks of information or "documents" transmitted over computer networks has placed significant demands on those networks, particularly wide area networks such as intranets, the Internet or the World Wide Web. The documents (e.g., an HTML web page and associated files) requested may be quite large and thus require a great deal of transmission bandwidth and a significant amount of time to retrieve the document. In the case of a wide area network, the requesting computer or "client" may be a long distance from the computer or "server" on which the document resides. When large distances are involved, the expense associated with the use of transmission lines for the communications naturally increases. In addition, the delay in the client receiving the document also increases which may result in a failure of a particular application, wasted computer time, and frustration on the part of users.

In order to decrease costs and transmission time, networks have begun to store or "cache" documents at various locations to reduce the distance between a user and the stored document. For instance, if a client in San Francisco requests a document which is located in New York, that request will generally flow through an intermediate server located in San Francisco. That intermediate server will request the document from the New York server and then transmit the document to the client. If the network is configured for caching, the intermediate receiver may also retain a copy of the document. When the intermediate server next receives a request for the document, the request will not be forwarded to the New York server. Instead, the transmission is interrupted by caching software at the intermediate server which retrieves the document from the intermediate server and forwards it to the client. Since all transmissions relating to fulfilling the second request for the document take place in the San Francisco area, transmission time and cost is greatly reduced.

One problem associated with caching documents is the possibility that the document cached at the intermediate server may become stale. The author of the document or others may make changes to the document at the "content providing" server in New York. If such a change is made the cached document in San Francisco is outdated or stale. In order to limit the number of stale documents which are cached, the intermediate server may destroy documents after a certain period of time or may destroy a document if a request for that document has not been received within a certain period of time. Such solutions are undesirable because they do not ensure that a cached document is not stale and require complete recopying of a document once it has been removed or flushed from a cache site. In other systems, the content providing server will notify any caching intermediate servers when a document has been altered or the intermediate server will request assurance that the document has not been changed prior to transmitting its own cached copy of the document. Such systems, however, also generally require complete retransmission of the document, along with the attendant delays, if the document has been changed.

Certain documents are not stored at a content providing server as a complete file, but are instead generated dynamically using a program which acts on data. The data may or may not be stored at the content providing server and may be subject to change or updating. Documents which are dynamically generated are usually done so in order to save storage space and because the data on which the document is based is frequently changed or updated. Caching of such dynamically generated documents is therefore problematic because those documents may require frequent updating and might also require retrieval of data, not just from the content providing server, but from other sources as well.

SUMMARY OF THE INVENTION

In accordance with one aspect of the present invention, a method of caching a dynamically generated document at an intermediate server includes receiving from a client, at the intermediate server, a request for a document located at a content providing server. The request is transmitted from the intermediate server to the content providing server and the content providing server obtains instructions and data for the document. The instructions and data for the document are transmitted to the intermediate server where the instructions and the data are stored. The document is transmitted from the intermediate server to the client.

The intermediate server may be located remote from the content providing the server. The data may be stored in a database and a database manager notifies the content providing server when the data are changed. The content providing server may notify the intermediate server when the data are changed.

The intermediate server may carry out the instructions utilizing the data to create a document. The instructions may be in the form of a CGI program.

The intermediate server may receive a second request for the document. The intermediate server then carries out the instructions utilizing the data to create the document and transmits the document to a client. A database manager may notify the content providing server when a database containing the data is being altered. The invention includes providing an apparatus for carrying out the method of the present invention.

In accordance with another aspect of the present invention, a method of dynamically generating a document at an intermediate server includes receiving from a client, at the intermediate server, a request for a document located at a content providing server. The document is of the type that can be generated from an instruction set using a data set. The request for the document is transmitted from the intermediate server to the content providing server and the instruction set is transmitted from the content providing server to the intermediate server. The instruction set is reviewed to determine if the intermediate server has the data set. If the intermediate server does not already have the data set, the intermediate server obtains the data set. The intermediate server thereafter creates the document and transmits the document to the client.

The intermediate server may retain the instruction set and the data set. Upon receiving a second request for the document at the intermediate server, the intermediate server may create the document utilizing the instruction set and the data set and then transmits the document. After receiving the second request, a determination may be made of whether the data set retained at the intermediate server is current. The content providing server may notify the intermediate server if the data set is changed.

A first portion of the data set may be located at the content providing server and a second portion of the data set may be located at a third server. The first portion of the data may be retained by the intermediate server.

Other features and advantages are inherent in the method and apparatus claimed and disclosed or will become apparent to those skilled in the art from the following detailed description in conjunction with the accompanying drawings.

DETAILED DESCRIPTION OF THE PREFERRED EMBODIMENT

Figure 1:
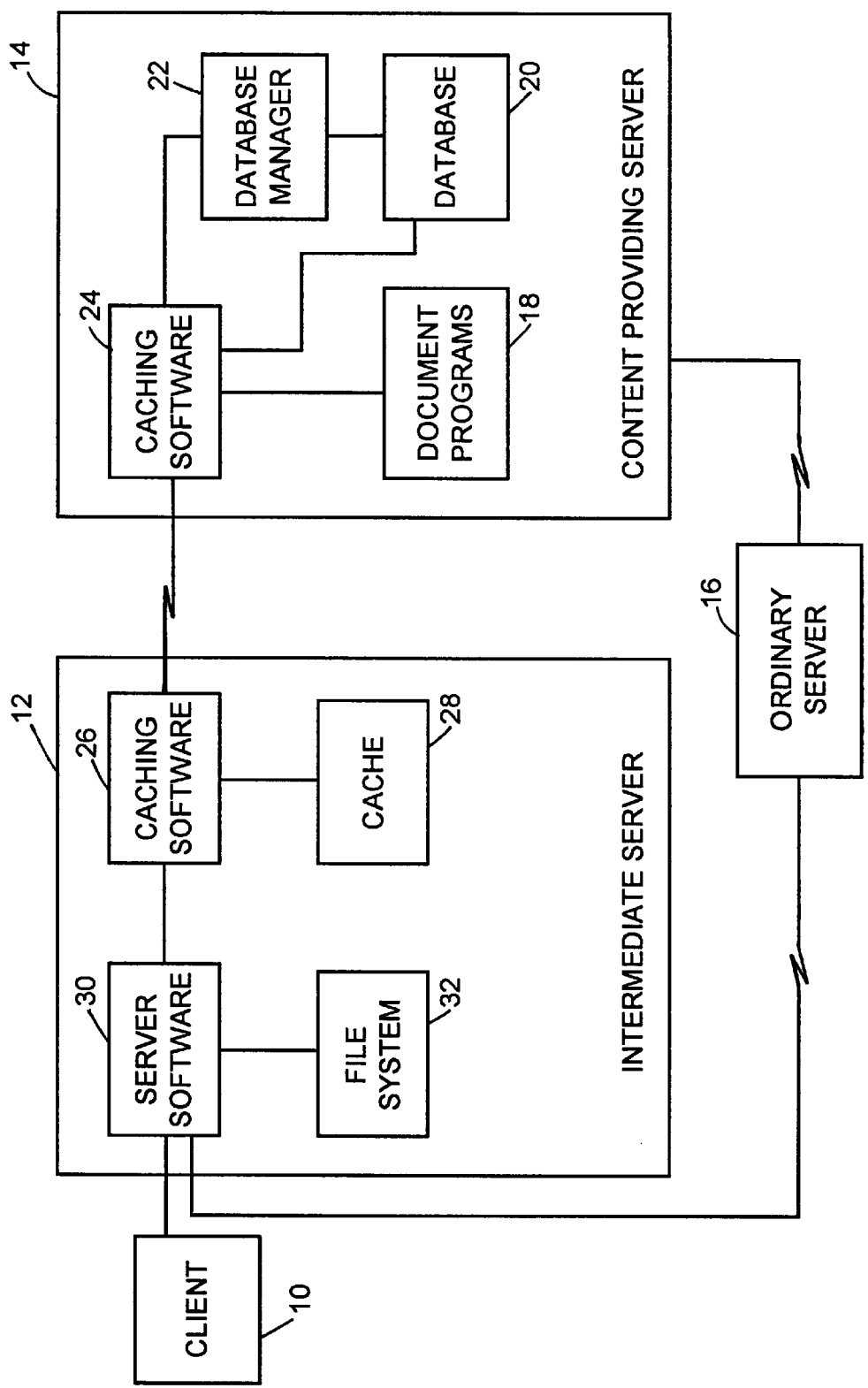
FIG. 1 is a block diagram of a computer network which may be utilized for carrying out embodiments of the present invention.

Referring initially to FIG. 1, a computer network includes a client computer 10 connected over a network to an intermediate server 12. The intermediate server 12 is connected to a content providing server 14, and both the intermediate server 12 and content providing server 14 may also be connected to an ordinary server 16. A variety of computer networks may be used with the present invention, including private intranets as well as the Internet and World Wide Web. When used in connection with the World Wide Web, the client computer 10 will ordinarily have web browser software and the content providing server 14 will have web server software. The intermediate server 12 may be a gateway for the client 10 to the rest of the network. A variety of routers, other servers and clients may also be present on the network, and are not depicted.

The content providing server 14 contains information which is needed to dynamically generate documents, i.e. generate a document when a request has been made for that document. In order to generate documents, the content providing server 14 includes files 18 of document programs. The document program files 18 contain computer programs written, for instance, in Common Gateway Interface (CGI) which includes sets of instructions for creating a particular document. In order to create the documents, the instruction sets or programs located in the files 18 operate on data stored in a database 20. The database 20 may contain various files of data including text, pictures, video or any other type of information which can be incorporated into a document. The database 20 may also contain various types of raw data, such as numbers, which may be acted upon by instruction sets in order to create text, video, pictures, etc. The database 20 is managed by a database manager 22 through which any additions, changes or deletions to the database 20 take place. Although the document programs files 18, the database 20, and database manager 22 are shown as part of the content providing server 14, they may in fact be located on a separate device. The document program files 18 and the database 20 may be stored in the same file system.

Each of the files 18 of document programs, the database 20 and the database manager 22, are connected either directly or indirectly to caching software 24 at the content providing server 14. The caching software 14 receives programs from the files 18 or data from the database 20 when an appropriate request for a document is received by the content providing server 14. The caching software 24 is also connected to the database manager 22 so that the database manager 22 can communicate any pertinent changes in the database 20 through the caching software 24. In a preferred embodiment, the caching software 24 may also be the database manager 22, which mirrors throughout the network changes in the database 20 or in the document programs 18. The content providing server 14 may maintain a register of all systems in order to mirror the database 20. The content providing server 14 may have numerous other software/hardware modules for implementing communication, managing files and other applications. In addition, the content providing server 14 may have ordinary web server software in order to provide complete documents over the network. The content providing server 14 may also have files of fully completed documents, i.e. non-dynamically generated documents which it may provide over the network with or without the caching functions described below. As is described more fully below, the caching software 24 manages the transmission of programs and data for dynamically generated documents to other servers, such as intermediate server 12, which are configured to cache programs and data.

The intermediate server 12 has caching software 26 which performs different functions than the caching software 24 on the content providing server 14. The caching software 26 is connected to a cache 28 which may contain a variety of files. Cache 28 may include programs or instruction sets for creating documents, data used in the creation of documents or complete documents. The content of the cache 28 and the availability of information in the cache 28 is controlled by the caching software 26. The caching software 26 is connected to server software 30 which receives requests from the client 10. The server software 30 processes the addresses of requests in order to determine the location to which the requests should be transmitted. If the address is a server having caching software 24, such as content providing server 14, the server software 30 will transmit the request to the caching software 26 and onto the content providing server 14. The server software 30 is also connected to a file system 32 which may contain a variety of files including documents having an address at the intermediate server 12. Although the file system 32 and cache 28 are shown as part of the intermediate server 12, they may be kept on separate devices.

The intermediate server 12 and the content providing server 14 are each connected to the ordinary server 16 over the network or any desired communication link. If the intermediate server 12 receives a request for a document which is located at the ordinary server 16, the server software 30 at the intermediate server 12 simply transmits that request to the ordinary server 16. The requested document is then returned by the ordinary server 16 to the intermediate server 12 and transmitted to the client 10. The ordinary server 16 may also have documents, portions of documents, or data which are used by document programs 18 to create complete or further documents. The intermediate server 12 may have additional modules not depicted such as other applications, data files, document program files and files of documents. The intermediate server 12 and the content providing server 14 may be any one of a variety of computers or combination of computers including Sun SparcStations having Solaris operating systems.

Figure 2:
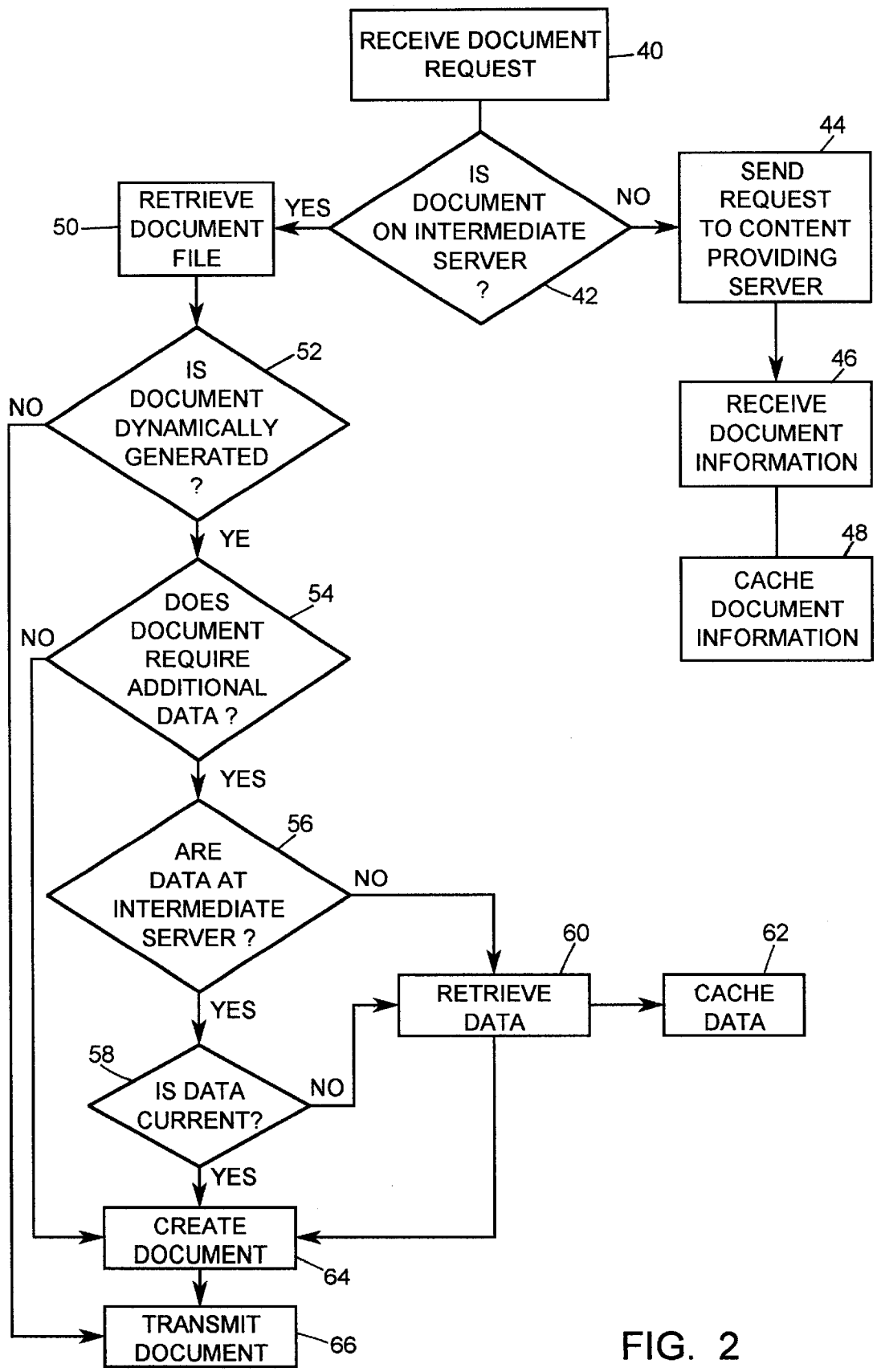
FIG. 2 is a flow chart of an intermediate server utilizing aspects of a method of the present invention.

Referring now to FIG. 2, a flow chart depicting the operation of the intermediate server 12 (shown in FIG. 1) begins at block 40 where the intermediate server 12 receives a document request such as from the client 10. At block 42, the server software 30 of the intermediate server 12 determines whether the requested document is already available at the intermediate server 12. Such a determination is generally made by utilizing the address in the document request. The determination may also be made by using the name of the documents where the server software 30 or other software at the intermediate server is configured to recognize document names. If the intermediate server 12 recognizes a requested document name as one that may be cached, the request is passed on to the caching software 26.

The caching software 26 then determines whether the document or portions of the document are located in the cache 28. If, at block 42, the document is not located on the intermediate server 12, a request is sent at block 44 for the document to be sent by the content providing server 14. At block 46 the intermediate server 12 receives document information, which may be in the form of a complete document or, in the case of dynamically generated documents, may be a document program and data required to create the document. At block 48 the document information, whether it be a complete document, a program or instructions to create a document or data used in creating the document, is cached or stored in the cache 28 of the intermediate server 12. Subsequently, control passes to block 52, and the process continues as described in detail below.

Returning to block 42, a document resides at the intermediate server 12 if the document has a document address such as one ending in "iserver" or is a document which is normally stored on the intermediate server 12. In addition, a document may reside on the intermediate server 12 if all or part of that document, such as instructions or data for creating that document, have been cached at the intermediate server 12. If the document is present on the intermediate server 12, control passes to block 50 to retrieve the file for the document. The system, at block 52 reviews the retrieved file to determine whether the document is a dynamically generated document, i.e. whether the document requires the running of a program or instruction set, utilizing data, to generate the document. Although a document was initially dynamically generated, it may be stored at the intermediate server as a complete document as the result of a previous request. If such a document is determined to be current, it need not be dynamically generated at that time. If the document is not current (as determined by one of the methods discussed below for determining whether data is current), the document must be dynamically generated using current data.

If the document is dynamically generated, control passes to block 54 to determine whether generation of the document requires additional data. Even if the document is dynamically generated, the file containing the instruction set may also contain the data which is required to create the document. The determination of whether the document requires additional data must be made for documents which reside or have been cached at the intermediate server 12 as well as for dynamically generated documents for which an instruction set has just been received at block 46 from a content providing server 14. If the document requires additional data, control passes to block 56 to determine whether the data is located at the intermediate server 12. When the document has been received from a content providing server 14 through block 46, the data may follow from the content providing server 14 soon after the program has been transmitted. In such an instance, the intermediate server 12 may simply wait momentarily for the intermediate server 12 to receive the required data.

If the data are located at the intermediate server 12, control passes to block 58 to determine whether the data are current. If the data have just been received, it may not be necessary to make such a determination. There are a variety of ways in which the system at block 58 can determine whether the data are current. For instance, each file containing cached data may have a lock on the file. The lock permits the system on which the file is located to utilize the data in the file. A lock may be received with the data when it is initially transmitted from the source of such data, such as the content providing server 14. If the data change, the caching software 24 of the content providing server 14 may notify all other servers on which the data have been cached, utilizing for instance the caching software 26 at the intermediate server 12. If such a notification is received at the intermediate server 12, the lock on the file will no longer permit the data to be used. In other embodiments, the notification may include updated or changed data in order to keep the file current. Other ways of insuring that the data are current include, sending a request from the intermediate server 12 to the content providing server 14 when the data are to be used. A comparison of the data may be necessary or the intermediate server 12 may simply request information regarding when the data was last changed and compare that with a time stamp on the data file located at the intermediate server 12.

If at block 56 the data are not located at the intermediate server 12 or, at block 58, the data are not current, control passes to block 60 to retrieve the data or retrieve a current version of the data. Data may be retrieved at block 60 from content providing server 14 or from an ordinary server 16. After the data have been received, control may pass to block 62 to cache the data. Normally only data received from a content providing server 14 having caching software 24 will be cached. It is possible to cache data from an ordinary server 16, however, the lack of caching software at the ordinary server 16 will prevent or make it difficult for the intermediate server 12 to determine whether the data are current. Thus the system generally would not cache such data thereby eliminating the danger of creating stale or outdated documents.

Once the system has determined at block 58 that the data at the intermediate server 12 are current or has retrieved at block 60, the necessary current data, control passes to block 64 to create a document. The documents created at block 64 are dynamically generated, therefore such creation involves the running of a program or set of instructions utilizing or operating on a set of data. A program or set of instructions may simply be the assembly of different groups of text in a particular format or template. The creation of the documents might also include inserting tables, pictures, video, or data into text. The programs may also be more complex, requiring the calculation of variables. Once the document has been created at block 64, or in the case of non-dynamically generated documents, received or retrieved, the document is transmitted at block 66 to the client 10.

Figure 3:
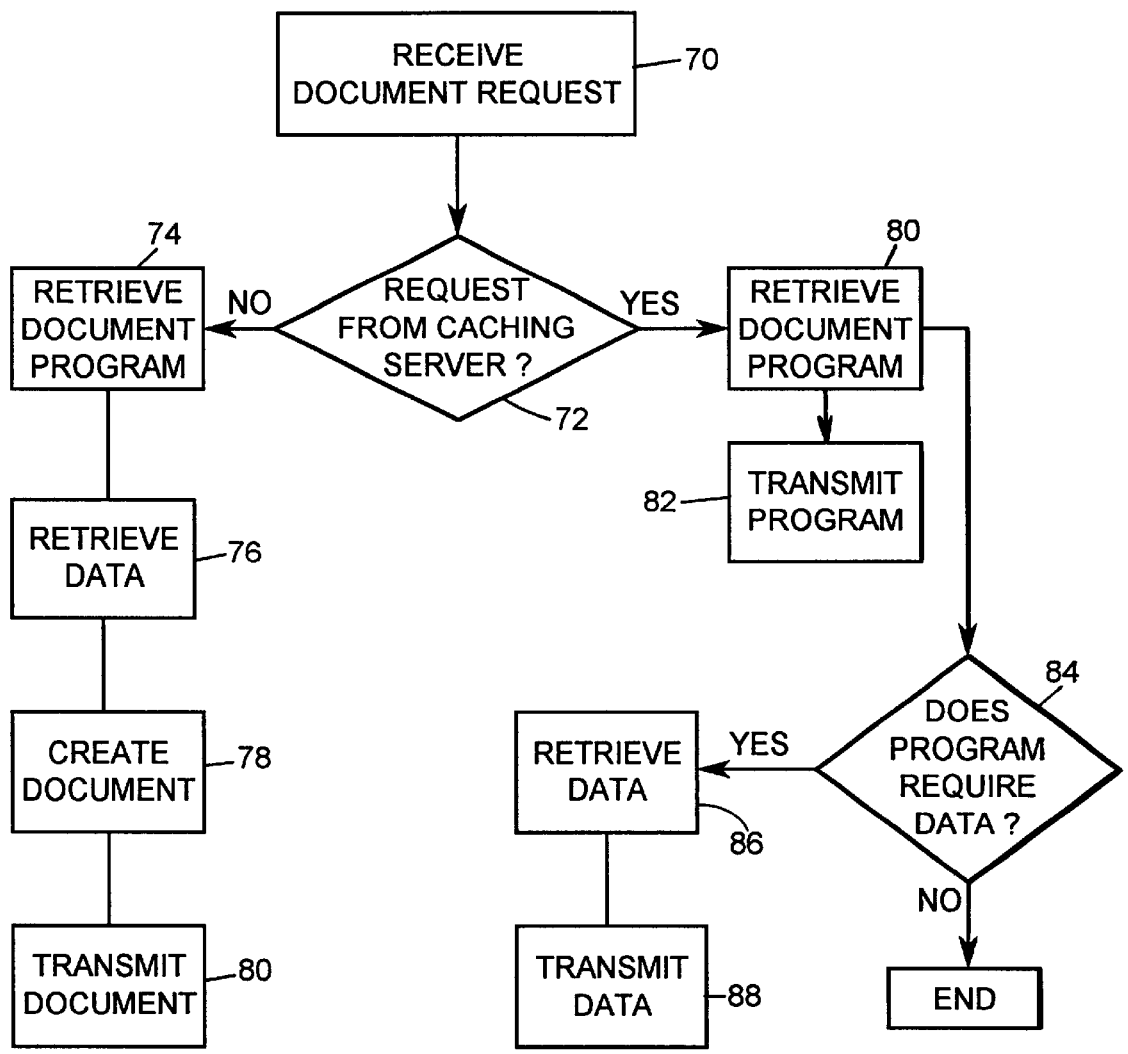
FIG. 3 is a flow chart of the operation of a content providing server utilizing aspects of a method of the present invention.

FIG. 3 depicts the procedure carried out by the caching software 24 of the content providing server 14 (shown in FIG. 1) upon receiving a request at block 70 for a dynamically generated document. At block 72, the content providing server 14 determines whether the request is from a caching server. If the request is not from a caching intermediate server, such as an intermediate server 12, there would be no purpose in sending the program for dynamically generating the document or the data used in that generation to such a server. The information would not be retained or cached by an intermediate server, and therefore would not be reused. Thus, when the request is not from a caching server, control passes to block 74 where the content providing server 14 retrieves the document program or set of instructions for creating the document. Control then passes to block 76 where the caching software 24 retrieves any data which is not included with the file containing the document program. Control then passes to block 78 where the program is run utilizing the data to create the document. The document is then transmitted at block 80.

If at block 72 the content providing server 14 determines that it received a request from a server having caching capabilities, control then passes to block 80 where the caching software 24 retrieves the file containing the program for generating the document. At block 82, that program is transmitted. Control also passes to block 84 where the content providing server 14 reviews the program in order to determine whether the program requires additional data beyond that contained in the file with the program. If no additional data are required, the process at the content providing server 14 ends. In the case of a request coming from a caching intermediate server, the content providing server 14 may transmit both the completed document and the program and data used to create that document.

If, at block 84, additional data are required, control passes to block 86 where the relevant data are retrieved. If the data are located at the content providing server 14, it will be retrieved from the database 20. If the necessary data are located on another server such as ordinary server 16, the caching software 24 may be configured for the content providing server 14 to retrieve the data, or the caching software 24 may simply allow the intermediate server 12 to retrieve the data directly from the ordinary server 16. Allowing the intermediate server 12 to retrieve the data located at ordinary server 16 directly, may save significant transmission time and bandwidth, particularly if the ordinary server 16 is located closer to the intermediate server 12 than to the content providing server 14. After any necessary data have been retrieved, control passes to block 88 where those data are transmitted to the intermediate server 12. The caching software 24 at the content providing server 14 will keep track of where it has sent programs or data for the creation of documents. Thus, when the database manager 22 notifies the caching software 24 of changes to the data or changes are made in the document programs 18, the content providing server 14 can notify the caching servers (such as intermediate server 12) of the changes.

By transmitting programs utilized in creating documents rather than just transmitting documents, the system of the present invention has numerous advantages. Once the document program and data required to create a document have been cached at an intermediate server, additional transmissions between the content providing server 14 and the intermediate server 12 are minimized. The intermediate server 12 need not obtain data from the database 20 each time a document is requested. However, if there have been changes to the database 20, only those changes or data need be sent to the intermediate server 12 to keep the cache 28 current. Such a system is far more efficient than sending an entire document or an update of an entire document whenever cached information at an intermediate server 12 has become stale.

In addition, by transmitting document programs to an intermediate server 12, that intermediate server can obtain data required for those documents from other servers such as ordinary server 16 with a minimum of transmission time and cost. The intermediate server 12 need only request the data directly from the ordinary server 16 rather than obtaining the data through the content providing server 14. Transmission time and costs can be greatly minimized, particularly where the ordinary server 16 is located close to the intermediate server 12.

Users at the client 10 receive numerous benefits, all of which are achieved transparently to the client 10. The time it takes to receive a requested document should be reduced without sacrificing accuracy or currentness of the documents.

The foregoing detailed description has been given for clearness of understanding only, and no unnecessary limitations should be understood therefrom, as modifications would be obvious to those skilled in the art.

What is claimed is:

1. A method of caching a dynamically generated document at an intermediate server comprising:
   receiving from the client, at the intermediate server, a request for a document located at a content providing server;
   transmitting the request from the intermediate server to the content providing server;
   obtaining instructions and data for the document at the content providing server;
   receiving the instructions and the data for the document from the content providing server;
   storing the instructions and the data at the intermediate server;
   creating the document at the intermediate server; and
   transmitting the document from the intermediate server to the client.

2. The method of claim 1 wherein the intermediate server is located remote from the content providing server.

3. The method of claim 1 wherein the data are stored in a database.

4. The method of claim 3 wherein a database manager notifies the content providing server when the data are changed.

5. The method of claim 4 wherein the content providing server notifies the intermediate server when the data are changed.

6. The method of claim 1 wherein, the intermediate server carries out the instructions, utilizing the data, to create the document.

7. The method of claim 1 wherein the instructions are a CGI program.

8. The method of claim 1 comprising:
   receiving a second request for the document at the intermediate server;
   carrying out the instructions at the intermediate server, utilizing the data to create the document; and
   transmitting the document to a client.

9. The method of claim 1 wherein, a database manager notifies the content providing server when a database containing the data is being altered.

10. An apparatus for caching a dynamically generated document at an intermediate server comprising:
    server software for receiving from a client, at the intermediate server, a request for a document located at a content providing server and for transmitting the document from the intermediate server to the client;
    caching software for transmitting the request from the intermediate server to the content providing server and for receiving instructions and data for dynamically generating the document from the content providing server at the intermediate server; and
    a cache for storing t he instructions and data at the intermediate server.

11. A method of dynamically generating a document at an intermediate server comprising:

receiving, from a client, at the intermediate server, a request for a document located at a content providing server, wherein the document can be generated from an instruction set utilizing a data set;

transmitting the request from the intermediate server to the content providing server;

transmitting the instruction set from the content providing server to the intermediate server;

reviewing the instruction set to determine if the intermediate server has the data set;

obtaining the data set at the intermediate server if the intermediate server does not already have the data set; and creating the document at the intermediate server and transmitting the document to the client.

12. The method of claim 11 comprising:

retaining the instruction set and the data set at the intermediate server;

receiving a second request for the document at the intermediate server;

creating the document utilizing the instruction set and the data set at the intermediate server; and transmitting the document.

13. The method of claim 12 comprising, after receiving the second request, determining if the data set retained at the intermediate server is current.

14. The method of claim 12 wherein the content providing server notifies the intermediate server if the data set is changed.

15. The method of claim 11 comprising, determining if the data set is current, if the intermediate server has the data set.

16. The method of claim 11 wherein the intermediate server is located remote from the content providing server.

17. The method of claim 11 wherein the instructions are a CGI program.

18. An apparatus for dynamically generating a document at an intermediate server comprising:

server software at the intermediate server for receiving from a client a request for a document located at a content providing server, wherein the document can be generated from an instruction set utilizing a data set, for creating the document, and for transmitting the document from the intermediate server to the client; and caching software at the intermediate server for transmitting the request from the intermediate server to the content providing server, for receiving the instruction set from the content providing server, and for receiving the data set if the intermediate server does not already have the data set.

19. The method of claim 11 wherein:

a first portion of the data set is located at the content providing server; and a second portion of the data set is located at a third server.

20. The method of claim 19 wherein the first portion of data is retained by the intermediate server.

21. A method of caching a dynamically generated document at an intermediate server comprising:

receiving a first request from a first client for a document located at a content providing server, wherein the document can be generated from an instruction set utilizing a data set;

transmitting the request from the intermediate server to the content providing server;

receiving the instruction set from the content providing server;

receiving a first data set from the content providing server;

transmitting the instruction set and the first data set for the document from the intermediate server to the first client;

receiving a second request from a second client for the document;

determining if the first data set is current;

transmitting the instruction set and the first data set for the document from the intermediate server to the second client if the first data set is current;

retrieving a second data set if the first data set is not current; and transmitting the instruction set and the second data set for the document from the intermediate server to the second client if the first data set is not current.

22. A method as defined in claim 21, wherein the first client is the same as the second client.

* * * * *